United States Patent
Martin

[15] 3,684,794
[45] Aug. 15, 1972

[54] 3-O-(α-L-MYCAROSYL)-8-HYDROXY-ERYTHRONOLIDE B

[72] Inventor: Jerry Roy Martin, Waukegan, Ill.
[73] Assignee: Abbott Laboratories, North Chicago, Ill.
[22] Filed: Dec. 18, 1970
[21] Appl. No.: 99,705

[52] U.S. Cl..................260/210 E, 195/80, 424/180
[51] Int. Cl..............................................C07c 47/18
[58] Field of Search...................................260/210 E Primary Examiner—Lewis Gotts
Assistant Examiner—Johnnie R. Brown
Attorney—Robert L. Niblack

[57] ABSTRACT

3-O-(α-L-mycarosyl)-8-hydroxyerythronolide B is useful as an antipyretic agent. The compound is prepared by the fermentation of 8-hydroxyerythronolide B with *Streptomyces erythreus* NRRL 3887 in a suitable nutrient media.

1 Claim, No Drawings

3-O-(α-L-MYCAROSYL)-8-HYDROXY-ERYTHRONOLIDE B

DISCLOSURE OF THE INVENTION

This invention relates to the novel compound 3-O-(α-L-mycarosyl-8-hydroxyerythronolide B which has useful pharmodynamic activity. More specifically, the compound of this invention has an antipyretic effect as demonstrated in standard animal pharmacological procedures. For example, an antipyretic effect is observed in yeast fevered rats at oral dosages of 100–200 mg/kg.

The compound of this invention has the following structural formula:

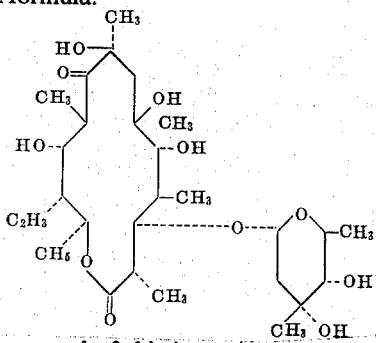

The compound of this invention is prepared by the fermentation of a nutrient media comprising a carbohydrate energy source such as a monosaccharide, e.g., glucose and corn starch; a source of nitrogen such as soy flour, corn steep liquor, ammonium nitrate and the like; and 8-hydroxyerhthronolide B, which media has been seeded with a culture of *Streptomyces erythreus* NRRL 3887. It is also preferable that the nutrient media comprise a buffering agent to moderate the pH. Such agents are dihydrogen, phosphate and alkaline earth carbonates, e.g., calcium carbonate.

The 8-hydroxyerythronolide B is obtained according to the method described in the U.S. Pat. application Ser. No. 99,641 entitled Erythronolide B Derivatives, filed concurrently with this application on behalf of Paul Kurath, on Dec. 18, 1970.

The compound of this invention may be administered orally or parenterally in conventional dosage forms such as tablets, capsules, injectables and the like, which incorporate 3-O-(α-L-mycarosyl-8-hydroxyerythronolide B alone, with other pharmacodynamically active substances, or with suitable carriers according to accepted pharmaceutical practices.

The foregoing description of the compound of this invention will now be further illustrated by a specific example setting forth the best mode of preparing the compound.

Seed cultures of *Streptomyces erythreus* NRRL 3887 were prepared in a medium consisting of (in grams per liter) glucose monohydrate (Cerelose), 15.0; soy bean meal, 15.0; and calcium carbonate, $CaCO_3$, 1.0. The cultures were incubated at 32° C for 72 hours on a rotary shaker. The seed was added at a level of 3–5 percent (v/v) into 500 ml Erlenmeyer flasks containing 50 ml of a fermentation medium consisting of the following components (in grams per liter): corn starch, 15.0; soya fluff flour, 20.0; corn steep, 5.0; $CaCO_3$, 1.0; and soy bean oil (Edsoy) 50.0. The medium was adjusted to pH 6.6 with sodium carbonate and autoclaved at 120° C. for 30 minutes at 15 pounds pressure before inoculation. The fermentation flasks were incubated at 32° C. on a rotary shaker (260 RPM) for 48 hours. One gram of finely divided 8-hydroxyerythronolide B was equally distributed among 40 fermentation flasks and incubation with shaking was continued for 120 hours.

The fermentation beer was clarified by the addition with stirring of an equal volume of an aqueous solution of 10 percent zinc sulfate followed by an equal volume of 0.5 N sodium hydroxide. A filter aid, Dicalite, was added and the mixture was stirred for 5 minutes. The mixture was filtered and the clear filtrate of pH 6.6 was collected. The filtrate was extracted twice with equal volumes of ethyl acetate. The combined ethyl acetate extract was washed twice with water and dried over anhydrous sodium sulfate. Concentration in vacuo gave 1.23 grams of viscous yellow-brown oil which solidified on standing. The solid material was dissolved in a small amount of chloroform and added to the top of a column (3.0 × 35 cm) of silica gel (Brinkman, 70–325 mesh) prepared in chloroform. Elution with increasing concentrations of methanol in chloroform gave fractions containing only a material with $R_f$ 0.29 by thin layer chromatography (Silica Gel G, 95 percent ethanol-chloroform, 1:10 v/v). These fractions were collected and the solvent removed in vacuo to give 797 mg of a light yellow oil. The oil was dissolved in methanol and treated with an equal weight charcoal (Darco G–60). Crystallization from methanol-water gave 327.5 mg of 3-α-L-mycarosyl-8-hydroxy-erythronolide B as fine white needles, m.p. 205°–208° C.

When the compound of this invention was administered orally at a dosage of 200 mg/kg of body weight to mice who had a yeast induced fever, the results were that at 1 hour following administration, the fever was reduced by 60.6 percent and 3 hours after administration, the reduction was 28.2 percent; at 100 mg/kg, the reduction was 15.9 and 5.5 percent respectively.

I claim:

1. A compound of the formula

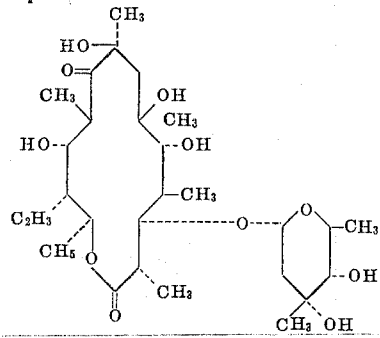

* * * * *

UNITED STATES PATENT OFFICE
CERTIFICATE OF CORRECTION

Patent No. 3,684,794  Dated August 15, 1972

Inventor(s) Jerry Roy Martin

It is certified that error appears in the above-identified patent and that said Letters Patent are hereby corrected as shown below:

In columns 1 and 2, the structural formula:

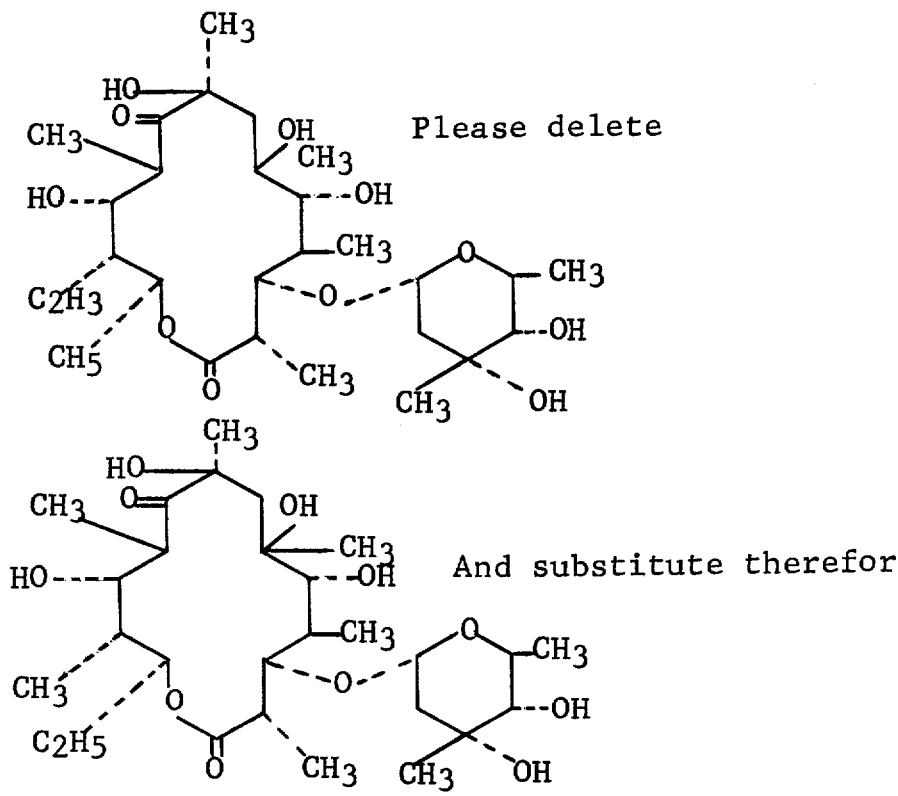

Column 2, line 42, please delete: 60.6 and substitute therefor: 69.6

Column 2, line 44, please delete: 15.9 and substitute therefor: -15.9

Signed and sealed this 15th day of May 1973.

(SEAL)
Attest:

EDWARD M. FLETCHER, JR.
Attesting Officer

ROBERT GOTTSCHALK
Commissioner of Patents